(12) United States Patent
Hsu

(10) Patent No.: US 12,496,545 B2
(45) Date of Patent: Dec. 16, 2025

(54) EXHAUST GAS EMISSION CIRCULATION FILTERING APPARATUS FOR AIR POLLUTION PREVENTION

(71) Applicant: Welter's Co., Ltd., Dou Liu (TW)

(72) Inventor: Walter W. Hsu, Dou Liu (TW)

(73) Assignee: WELTER'S CO., LTD., Dou Liu (TW)

( * ) Notice: Subject to any disclaimer, the term of this patent is extended or adjusted under 35 U.S.C. 154(b) by 337 days.

(21) Appl. No.: 18/310,631

(22) Filed: May 2, 2023

(65) Prior Publication Data

US 2024/0367083 A1 Nov. 7, 2024

(51) Int. Cl.
*B01D 46/00* (2022.01)
*B01D 46/18* (2006.01)
*B01D 46/22* (2006.01)
*B01D 46/79* (2022.01)

(52) U.S. Cl.
CPC ........... *B01D 46/22* (2013.01); *B01D 46/185* (2013.01); *B01D 46/79* (2022.01); *B01D 2273/14* (2013.01)

(58) Field of Classification Search
CPC ...... B01D 46/22; B01D 46/185; B01D 46/79; B01D 2273/14; B01D 46/681
USPC ........................................................ 96/229
See application file for complete search history.

(56) References Cited

U.S. PATENT DOCUMENTS

| 3,487,620 | A  | * | 1/1970  | Klein  | F23J 15/04 |
|           |    |   |         |        | 55/354     |
| 2006/0021934 | A1 | * | 2/2006 | Cho | B01D 39/12 |
|           |    |   |         |        | 156/60     |
| 2007/0298700 | A1 | * | 12/2007 | Datta | F23L 17/02 |
|           |    |   |         |        | 110/184    |

* cited by examiner

*Primary Examiner* — T. Bennett Mckenzie
(74) *Attorney, Agent, or Firm* — LANWAY IPR SERVICES; Chun-Ming Shih

(57) ABSTRACT

A filtering apparatus includes an exhaust pipe, multiple air exhaust devices, a conveyor, a filtering net, a tank washing device, and a cleaning device. The exhaust pipe includes multiple air outlets. The air exhaust devices align with the air outlets respectively. The conveyor includes a first delivery circuit extending through the air outlets and a second delivery circuit connecting the first delivery circuit. The filtering net extends through the first delivery circuit and the second delivery circuit. The tank washing device is arranged in the second delivery circuit and includes a liquid tank. The cleaning device is mounted in the tank washing device and includes multiple rolling shafts each provided with multiple brushes. The filtering net is moved between the first delivery circuit and the second delivery circuit to perform two-stage purifying circulation to drain a purified gas from the air exhaust devices.

8 Claims, 11 Drawing Sheets

EXHAUST GAS EMISSION CIRCULATION FILTERING APPARATUS FOR AIR POLLUTION PREVENTION

BACKGROUND OF THE INVENTION

Field of the Invention

The present invention relates to a filtering apparatus and, more particularly, to an exhaust gas emission circulation filtering (or purifying) apparatus for air pollution prevention.

Description of the Related Art

Nowadays, waste gas and black smoke generated during a waste burning process not only discharge pollutants into the air, but also release a large amount of carbon dioxide, which leads to climate change and serious air pollution. The air pollution is a global problem and has almost seriously affected health of the human body. In order to improve emission of the exhaust gas, sprinkler equipment is generally installed on the chimney to absorb dirt by spraying atomized liquid, so as to reduce the damage caused by black smoke to the environment. However, the temperature of the chimney is too high, so that the water spray system installed on the chimney is easily damaged due to the high temperature.

BRIEF SUMMARY OF THE INVENTION

In accordance with the present invention, there is provided a filtering apparatus comprising: an exhaust pipe, multiple air exhaust devices, a conveyor, a filtering net, a tank washing device, and a cleaning device. The exhaust pipe includes multiple air outlets. The air exhaust devices are mounted on the exhaust pipe and located at an outside of the air outlets. The air exhaust devices align with the air outlets respectively. The conveyor includes a first delivery circuit extending in a horizontal axial direction and a second delivery circuit extending in a vertical longitudinal direction. The first delivery circuit extends through the air outlets. The second delivery circuit connects the first delivery circuit. The first delivery circuit and the second delivery circuit form a two-stage rotation loop. The filtering net extends through the first delivery circuit and the second delivery circuit and is movable reciprocatingly in the two-stage rotation loop of the first delivery circuit and the second delivery circuit. The tank washing device is arranged in the second delivery circuit and includes a liquid tank. The cleaning device is mounted in the tank washing device and includes multiple rolling shafts. Each of the rolling shafts is provided with multiple brushes. The conveyor is electrically connected with an external power supply. The conveyor is operated by the external power supply to drive the filtering net. The filtering net is driven by the conveyor and moves along the two-stage rotation loop of the conveyor reciprocatingly. When the filtering net is moved in the first delivery circuit and passes through the air outlets, the filtering net performs a filtering process. When the filtering net is moved in the second delivery circuit, the filtering net performs a cleaning process and is washed and cleaned by the tank washing device and the cleaning device. The filtering net is moved between the first delivery circuit and the second delivery circuit to perform two-stage purifying circulation reciprocatingly to drain a purified gas from the air exhaust devices.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
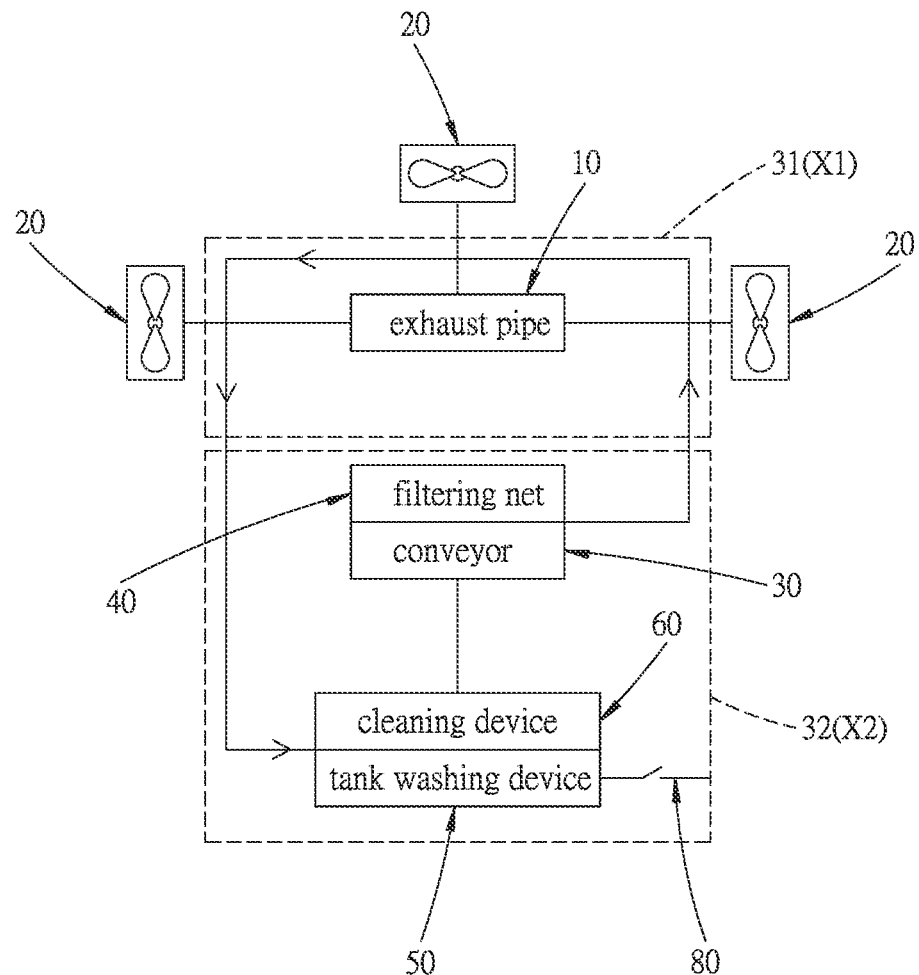
FIG. 1 is a block flow chart of a filtering apparatus in accordance with the present invention.

Referring to the drawings and initially to FIGS. 1-6, a filtering apparatus 100 in accordance with the preferred embodiment of the present invention comprises an exhaust pipe 10, multiple air exhaust devices 20, a conveyor 30, a filtering (or straining) net 40, a tank washing device 50, and a cleaning device 60.

The exhaust pipe 10 includes multiple air outlets 11. The air exhaust devices 20 are mounted on the exhaust pipe 10 and located at an outside of the air outlets 11. The air exhaust devices 20 align with the air outlets 11 respectively. The conveyor 30 includes a first delivery circuit 31 extending in a horizontal axial direction and a second delivery circuit 32 extending in a vertical longitudinal direction. The first delivery circuit 31 extends through the air outlets 11. The second delivery circuit 32 connects the first delivery circuit 31. The first delivery circuit 31 and the second delivery circuit 32 form a two-stage rotation loop. The filtering net 40 extends through the first delivery circuit 31 and the second delivery circuit 32 and is movable reciprocatingly in the two-stage rotation loop of the first delivery circuit 31 and the second delivery circuit 32. The tank washing device 50 is arranged in the second delivery circuit 32 and includes a liquid tank 51 that contains alkaline washing liquid. The cleaning device 60 is mounted in the liquid tank 51 of the tank washing device 50 and includes multiple rolling shafts 61 arranged in an interval. Each of the rolling shafts 61 is provided with multiple brushes 62 that are used to wash and clean the filtering net 40.

In the preferred embodiment of the present invention, the first delivery circuit 31 and the second delivery circuit 32 are perpendicular to each other.

In the preferred embodiment of the present invention, the conveyor 30 includes multiple rolls (or rollers) 301 pressing the filtering net 40. The rolls 301 are arranged in the first delivery circuit 31 and the second delivery circuit 32 and rotated simultaneously to move the filtering net 40.

In the preferred embodiment of the present invention, the filtering net 40 is made of a composite fabric with one layer or multiple layers.

In the preferred embodiment of the present invention, the filtering net 40 is made of an active (or activated) carbon or a HEPA high efficiency filter screen.

In the preferred embodiment of the present invention, the filtering net 40 is a wet filtering net. Thus, the water molecules are adhered to the filtering net 40 by a surface tension to form a water film layer on the filtering net 40 so that the filtering net 40 forms an isolating layer to isolate fine suspended particles (such as PM2.5) and to prevent odors from being spread.

In the preferred embodiment of the present invention, the air exhaust devices 20 have a number matching that of the air outlets 11 of the exhaust pipe 10.

In the preferred embodiment of the present invention, the tank washing device 50 further includes multiple dust collecting containers (or tubes or canisters or cylinders) 52 removably mounted on a bottom of the liquid tank 51, and multiple movable ports 53 mounted between the liquid tank 51 and one of the dust collecting containers 52. The dirt in the liquid tank 51 is drained through the movable ports 53 into the dust collecting containers 52. Each of the dust collecting containers 52 can be removed from the liquid tank 51 for maintenance.

In the preferred embodiment of the present invention, the second delivery circuit 32 passes through the liquid tank 51 of the tank washing device 50 and the cleaning device 60.

In the preferred embodiment of the present invention, the tank washing device 50 is disposed under the air outlets 11 of the exhaust pipe 10.

In the preferred embodiment of the present invention, the air outlets 11 are located at a peripheral wall of the exhaust pipe 10. The exhaust pipe 10 has an interior provided with a hollow channel and has a bottom connected to an air inlet of a burner to deliver burned gas drained from the burner.

In the preferred embodiment of the present invention, each of the air exhaust devices 20 is a centrifugal fan that is rotated to produce an air power or a suction force to drain the purified gas from the exhaust pipe 10.

In the preferred embodiment of the present invention, the first delivery circuit 31 is in the horizontal axial direction the same as that of the air outlets 11.

In the preferred embodiment of the present invention, each of the rolls 301 has a ratchet surface A that engages the filtering net 40 to provide an auxiliary pulling force to the filtering net 40.

In the preferred embodiment of the present invention, the filtering net 40 is an elongate strip that encircles the first delivery circuit 31 and the second delivery circuit 32.

In the preferred embodiment of the present invention, when the filtering net 40 is moved in the first delivery circuit 31 and passes through the air outlets 11, the filtering net 40 performs a filtering process X1 to filter the exhaust gas drained from the air outlets 11 of the exhaust pipe 10, and to adhere harmful substances contained in the exhaust gas, such as micro particles, powder dust, suspended particles or the like. The purified gas is drawn outward from the air exhaust devices 20. In addition, when the filtering net 40 is moved in the second delivery circuit 32, the filtering net 40 is washed and cleaned by the tank washing device 50 and the cleaning device 60 to perform a cleaning process X2. At this time, the filtering net 40 is wet and contains water molecules which are adhered to the filtering net 40 by a surface tension to reduce a straining density of the filtering net 40 such that the filtering net 40 is used to filter micro molecules. At the same time, a water film layer is formed on and adhered to the filtering net 40 so that the filtering net 40 forms an isolating layer to stick harmful substances and adhere odors. After the filtering net 40 is cleaned, the filtering net 40 is delivered to the first delivery circuit 31. Thus, the filtering net 40 is delivered to the first delivery circuit 31 to perform a filtering process X1 for filtering the exhaust gas drained from the air outlets 11 of the exhaust pipe 10, and is then delivered to the second delivery circuit 32 to perform a cleaning process X2. In such a manner, the filtering net 40 is moved between the first delivery circuit 31 and the second delivery circuit 32 to perform a two-stage purifying circulation reciprocatingly and to drain a purified gas from the air exhaust devices 20.

Figure 2:
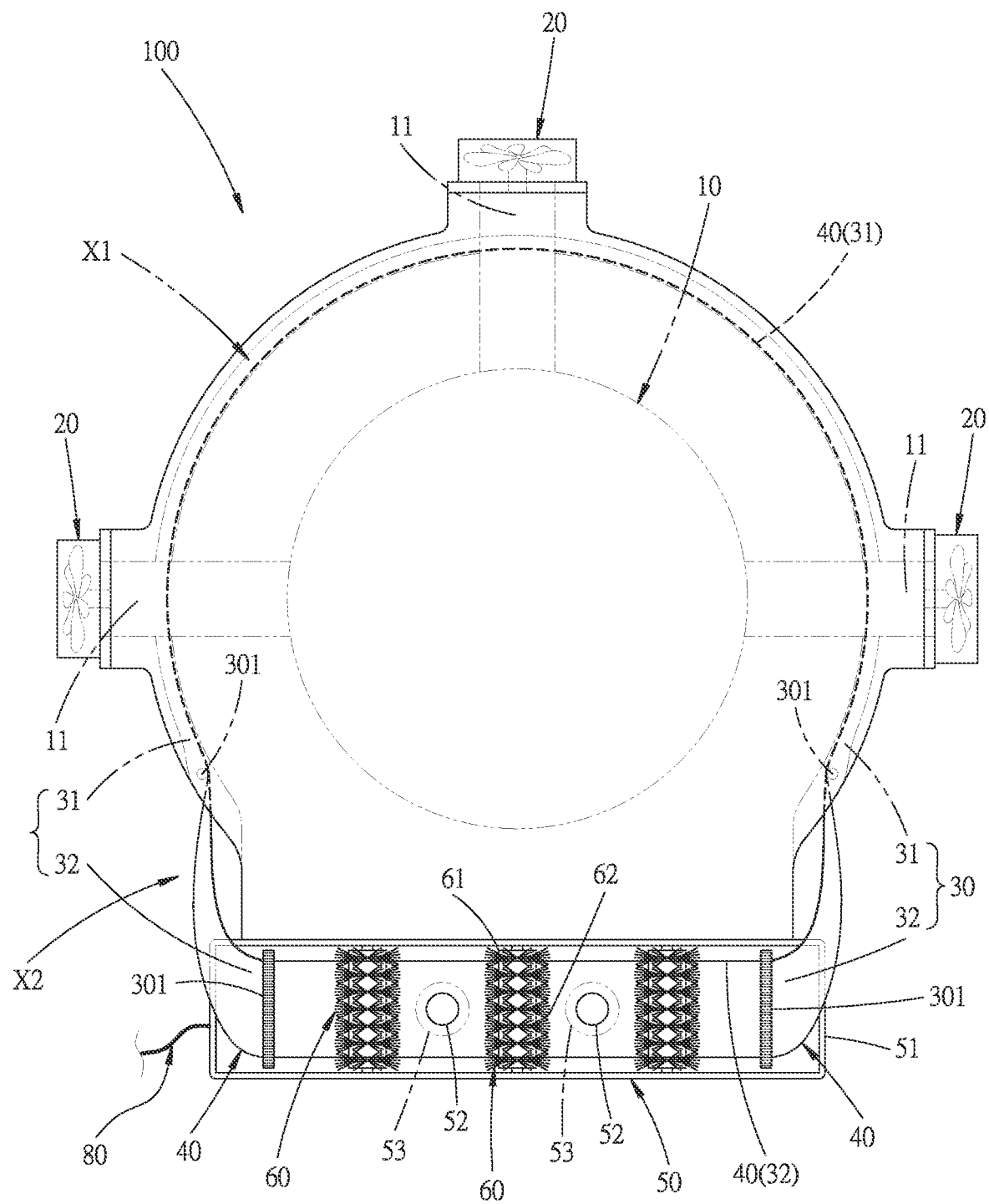
FIG. 2 is a top view of the filtering apparatus in accordance with the present invention.
Figure 3:
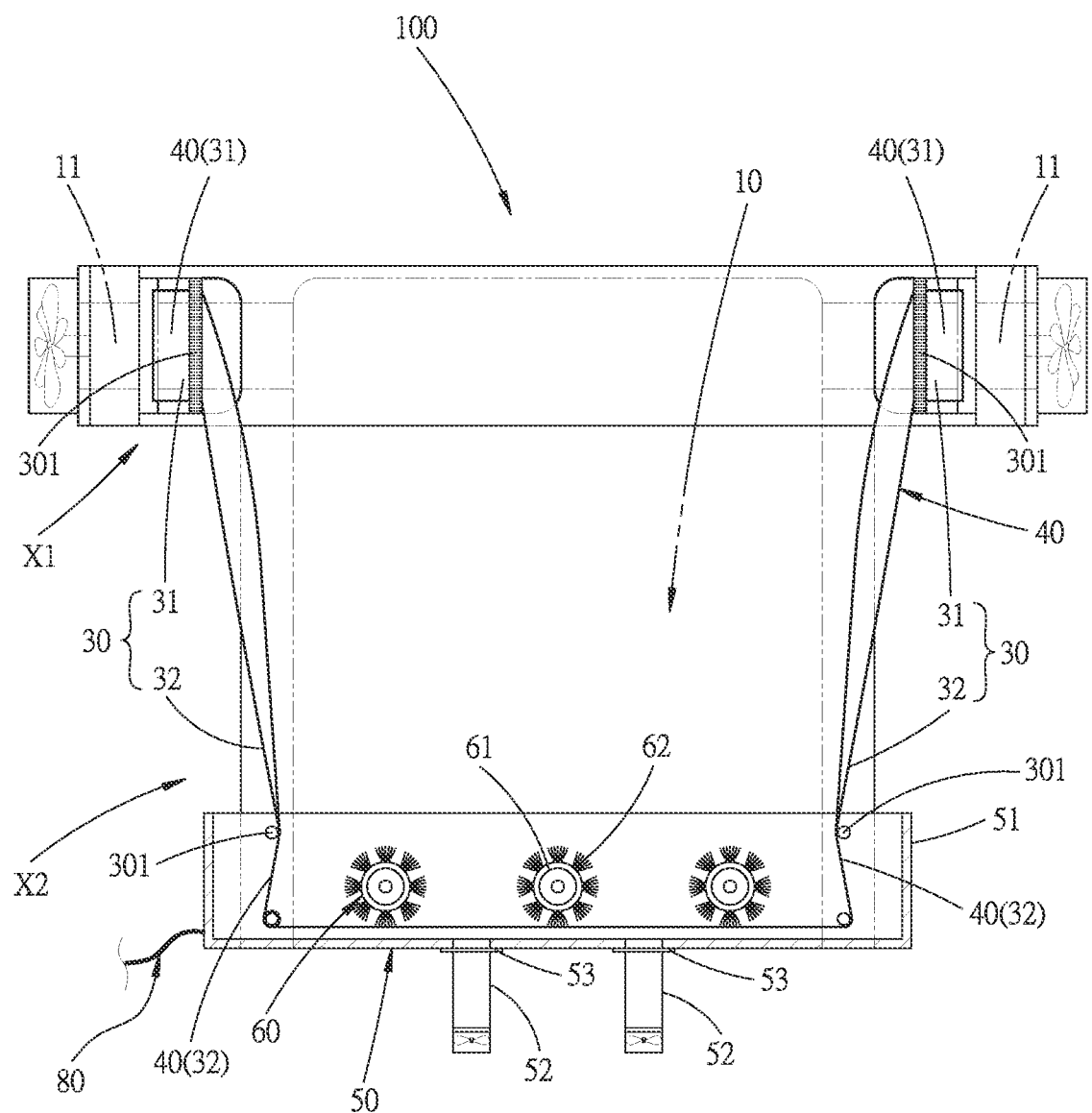
FIG. 3 is a side view of the filtering apparatus in accordance with the present invention.
Figure 4:
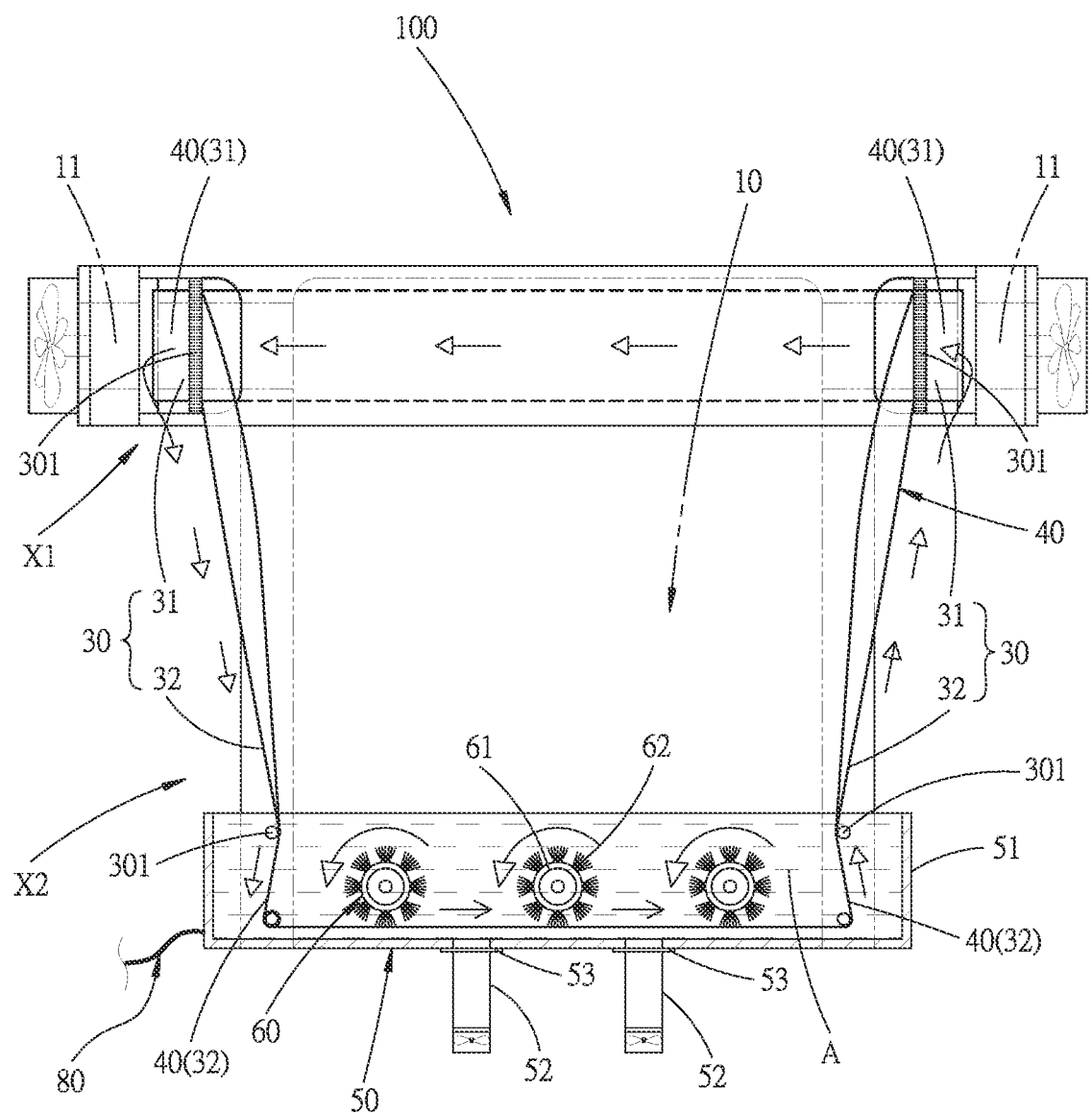
FIG. 4 is a schematic operational view of the filtering apparatus as shown in FIG. 3.
Figure 5:
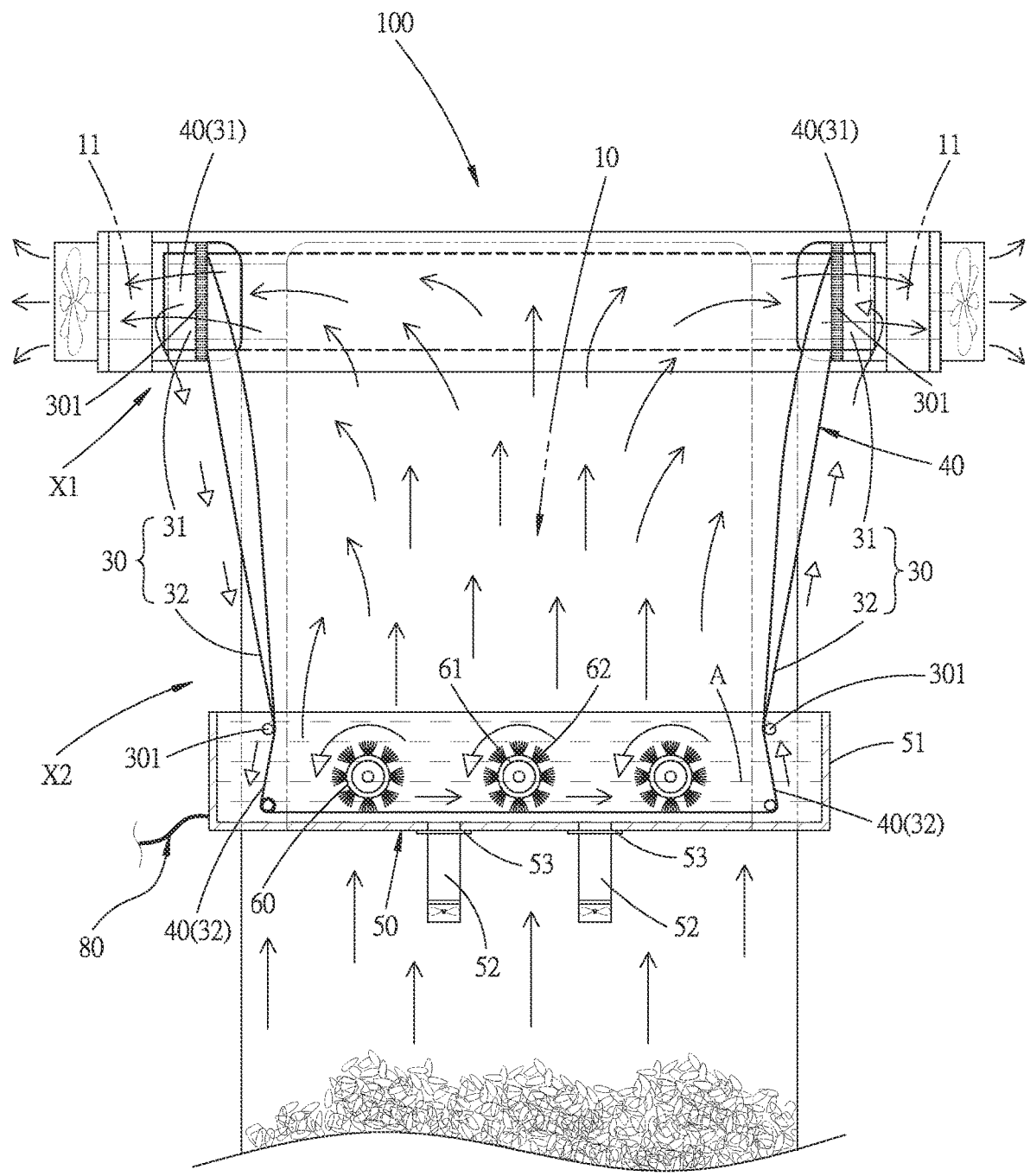
FIG. 5 is another schematic operational view of the filtering apparatus applied for a burner.
Figure 6:
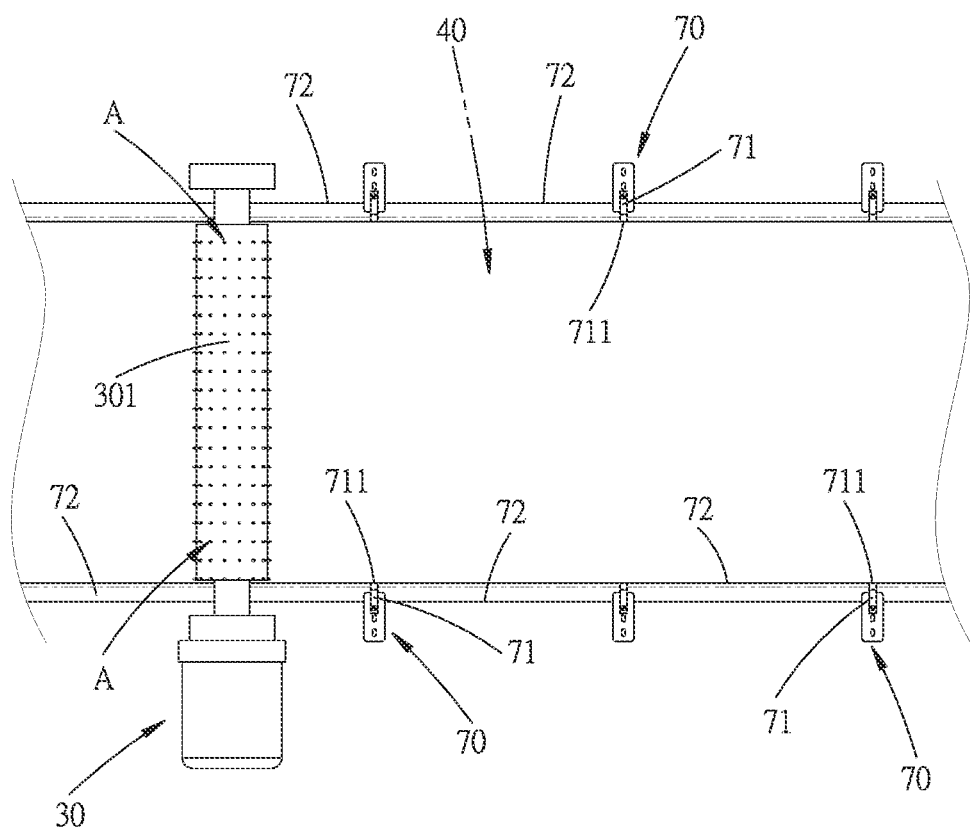
FIG. 6 is a schematic view showing a filtering net is driven by a conveyor.
Figure 7:
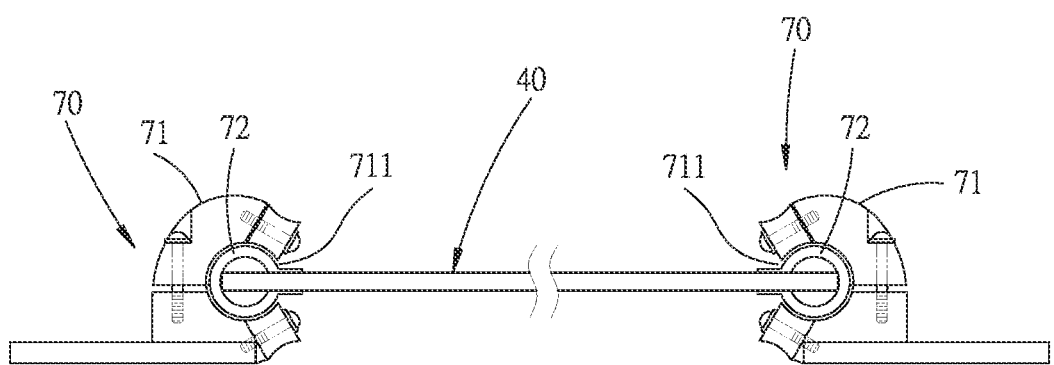
FIG. 7 is a schematic view showing a deflection prevention device.
Figure 8:
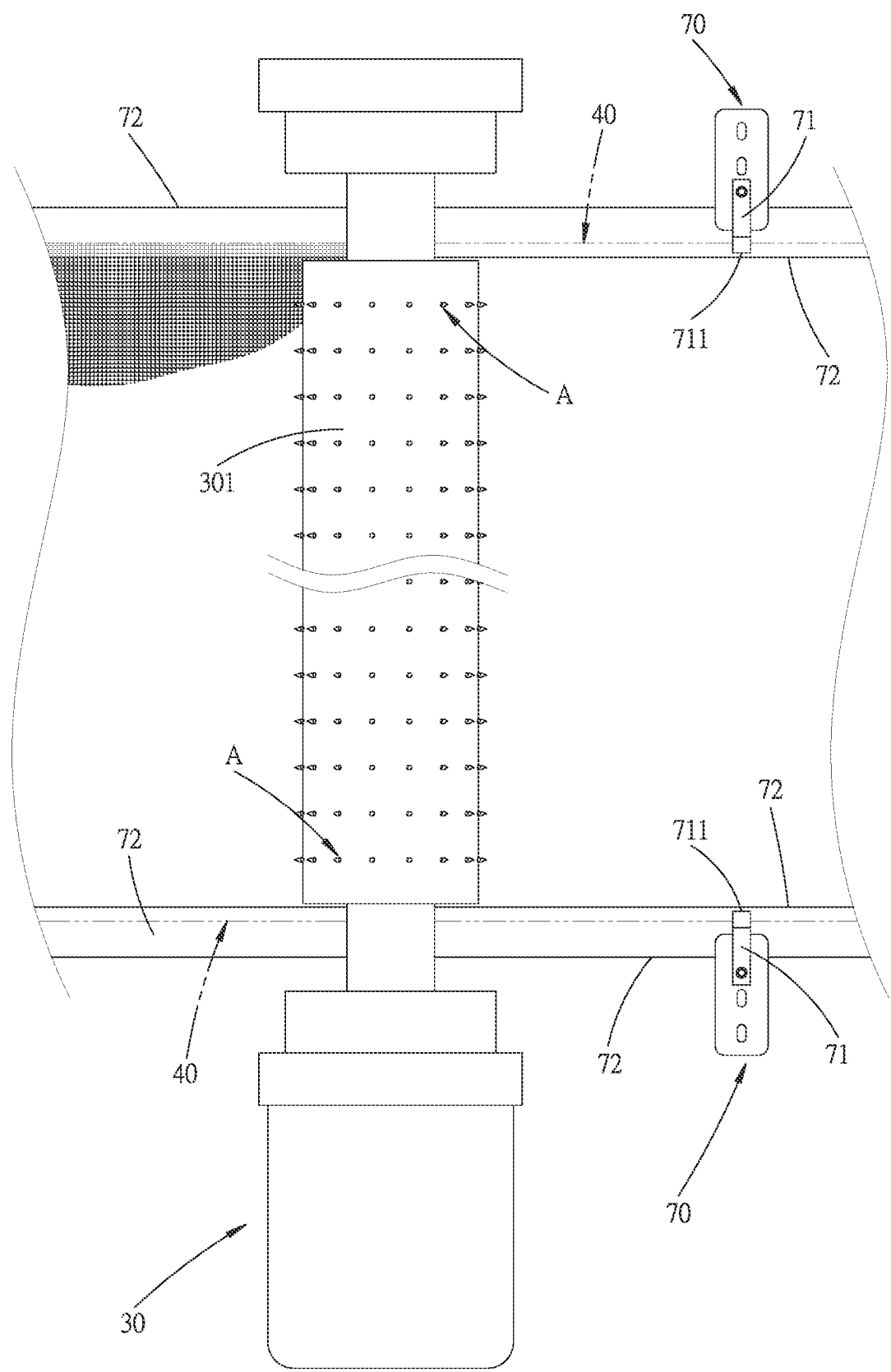
FIG. 8 is a locally enlarged view of FIG. 6.
Figure 9:
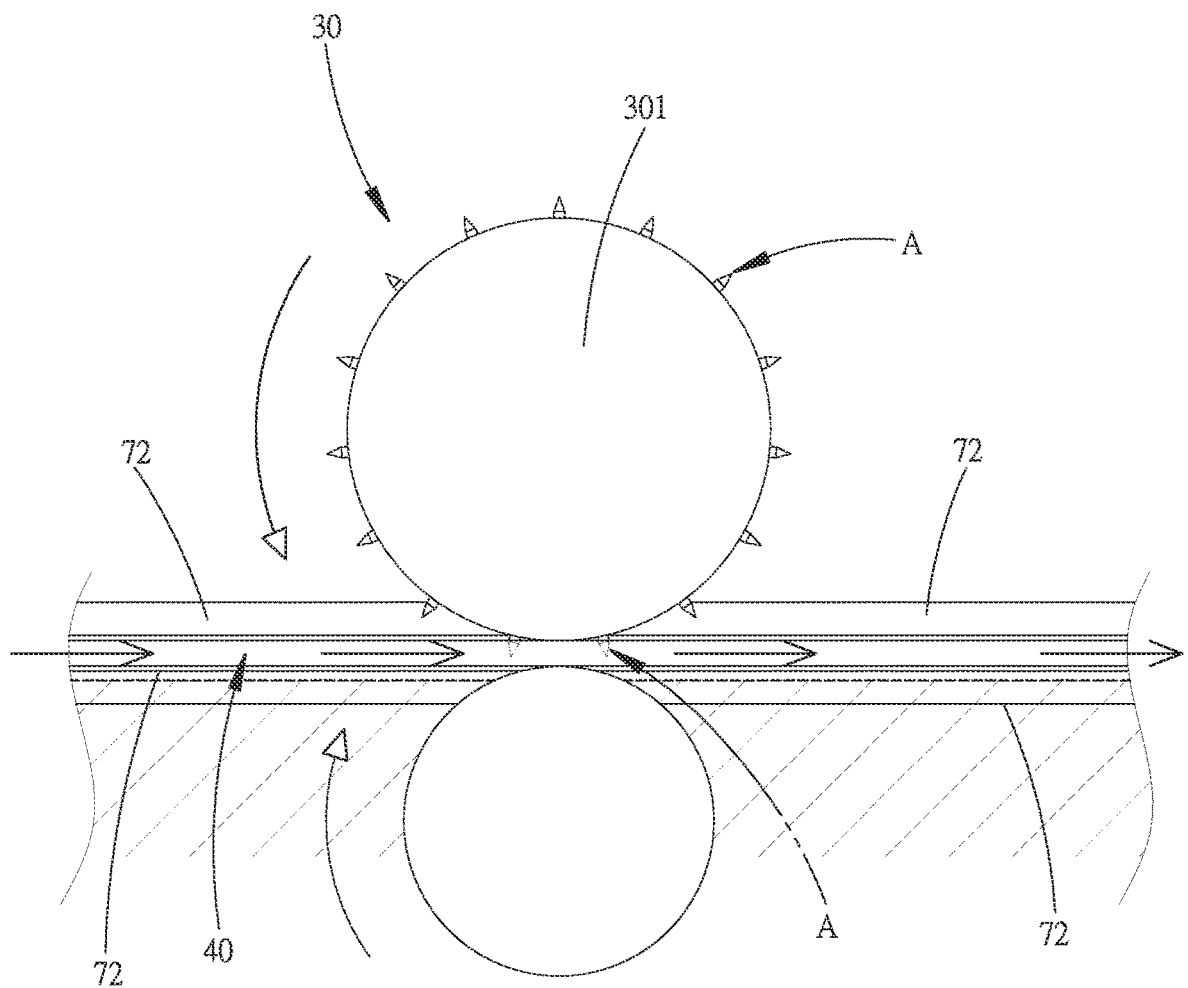
FIG. 9 is a locally enlarged cross-sectional view of FIG. 6.
Figure 10:
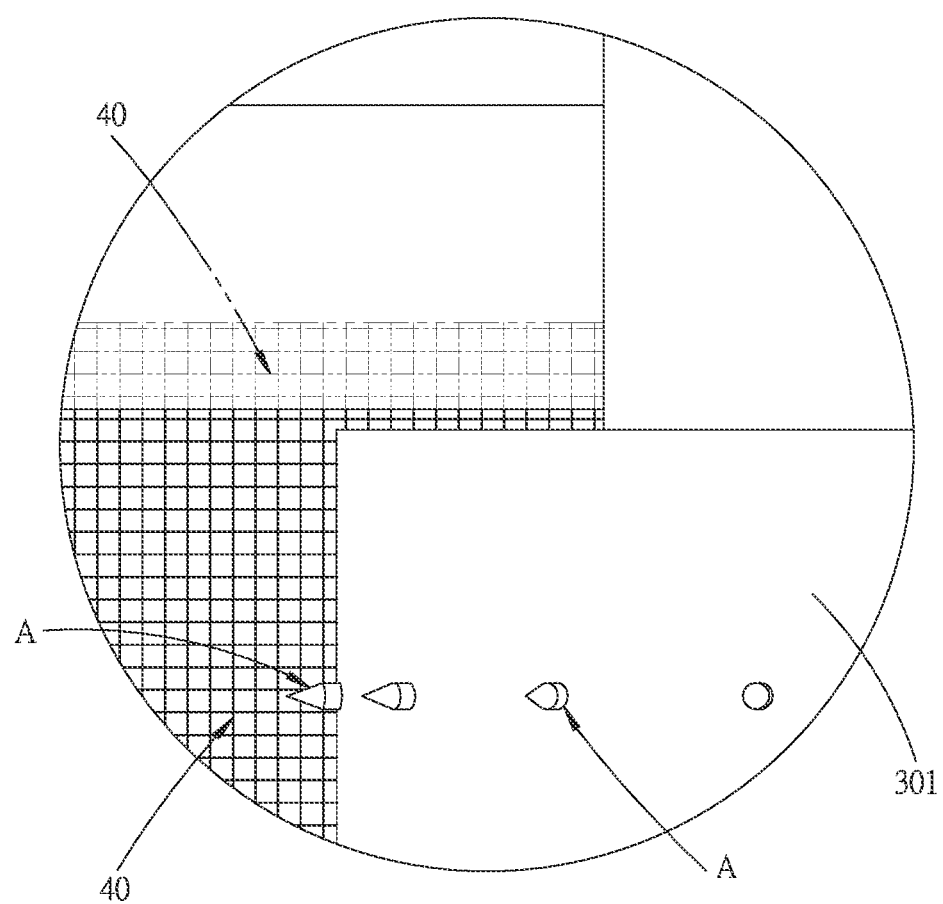
FIG. 10 is a locally enlarged top view of FIG. 6.
Figure 11:
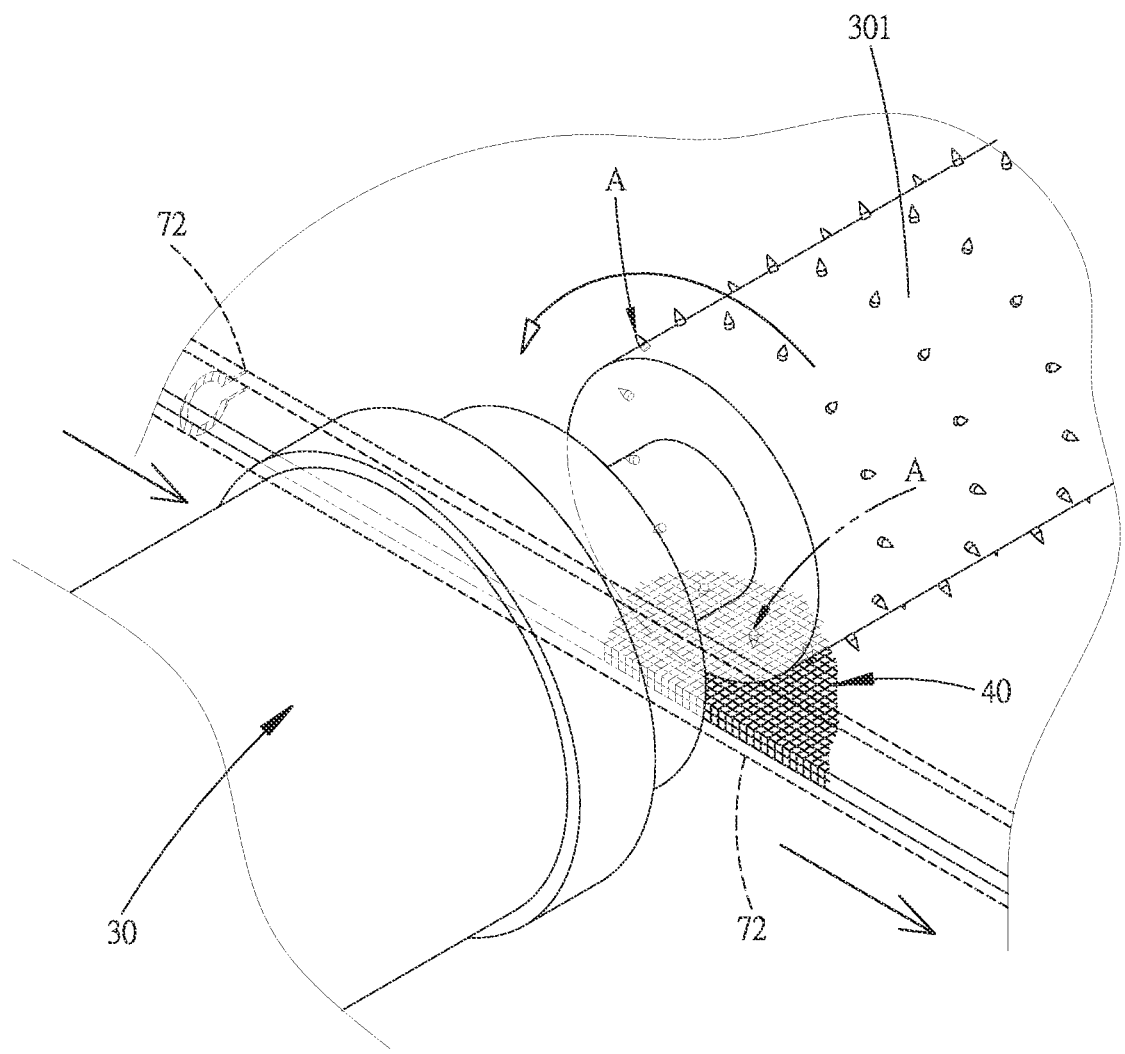
FIG. 11 is a locally enlarged perspective view of FIG. 6.

In practice, referring to FIGS. 4 and 5 with reference to FIGS. 1-3, the conveyor 30 is electrically connected with an external power supply 80. The conveyor 30 is operated by the external power supply 80 to drive the filtering net 40. The filtering net 40 is driven by the conveyor 30 and encircles and moves along the two-stage rotation loop of the first delivery circuit 31 and the second delivery circuit 32 of the conveyor 30 reciprocatingly. When the filtering net 40 is moved in the first delivery circuit 31 and passes through the air outlets 11, the filtering net 40 strains air particles, impurities, and powder dust. When the filtering net 40 is moved in the second delivery circuit 32, the filtering net 40 is washed and cleaned by the tank washing device 50 and the cleaning device 60, so that the filtering net 40 is wet and contains water molecules which are adhered to the filtering net 40 by a surface tension to reduce a straining density of the filtering net 40 such that the filtering net 40 is used to filter micro molecules. At the same time, a water film layer is formed on and adhered to the filtering net 40 so that the filtering net 40 forms an isolating layer to stick harmful substances and to adhere odors. Thus, the filtering net 40 is moved in the first delivery circuit 31 to perform a filtering process X1 and is moved in the second delivery circuit 32 to perform a cleaning process X2, so that the filtering net 40 is moved between the first delivery circuit 31 and the second delivery circuit 32 as shown in FIG. 4 to perform two-stage purifying circulation reciprocatingly to drain a purified gas from the air exhaust devices 20 as shown in FIG. 5.

Referring to FIGS. 6-11 with reference to FIGS. 1-5, the filtering apparatus 100 further comprises a deflection prevention device 70 including multiple positioning seats 71 and multiple positioning snaps 72. The positioning seats 71 are mounted on two sides of each of the first delivery circuit 31 and the second delivery circuit 32 in a parallel manner. Each of the positioning seats 71 is provided with a C-shaped slot 711. The positioning snaps 72 are mounted on two sides of the filtering net 40 and align with the positioning seats 71 respectively. Each of the positioning snaps 72 is a C-shaped clamp or fastener. Each of the positioning snaps 72 is moved with the filtering net 40 and is allowed to pass through the C-shaped slot 711 of one of the positioning seats 71. A distance between two of the positioning snaps 72 is equal to that between the C-shaped slots 711 of two of the positioning seats 71. Thus, the deflection prevention device 70 is used to calibrate and retain the transport path of the filtering net 40 to prevent the filtering net 40 from being deflected or deviated during the delivery process.

Accordingly, the filtering net 40 is moved in the first delivery circuit 31 to perform a filtering process X1 and is moved in the second delivery circuit 32 to perform a cleaning process X2, so that the filtering net 40 is moved between the first delivery circuit 31 and the second delivery circuit 32 to perform two-stage exhaust gas purifying circulation reciprocatingly to drain a purified gas from the air exhaust devices 20, thereby enhancing the exhaust gas purifying effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A filtering apparatus comprising:
an exhaust pipe, multiple air exhaust devices, a conveyor, a filtering net, a tank washing device, and a cleaning device;
wherein:
the exhaust pipe includes multiple air outlets;
the air exhaust devices are mounted on the exhaust pipe and located at an outside of the air outlets;
the air exhaust devices align with the air outlets respectively;
the conveyor includes a first delivery circuit extending in a horizontal axial direction and a second delivery circuit extending in a vertical longitudinal direction;
the first delivery circuit extends through the air outlets;
the second delivery circuit connects the first delivery circuit;
the first delivery circuit and the second delivery circuit form a two-stage rotation loop;
the filtering net extends through the first delivery circuit and the second delivery circuit and is movable reciprocatingly in the two-stage rotation loop of the first delivery circuit and the second delivery circuit;
the tank washing device is arranged in the second delivery circuit and includes a liquid tank;
the cleaning device is mounted in the tank washing device and includes multiple rolling shafts;
each of the rolling shafts is provided with multiple brushes;
the conveyor is electrically connected with an external power supply;
the conveyor is configured to be operated by the external power supply to drive the filtering net;
the filtering net is drivable by the conveyor and movable along the two-stage rotation loop of the conveyor reciprocatingly;
when the filtering net is movable in the first delivery circuit and configured to pass passes through the air outlets, the filtering net is configured to perform a filtering process;
when the filtering net is movable in the second delivery circuit, the filtering net is configured to performs a cleaning process and is configured to be washed and cleaned by the tank washing device and the cleaning device; and
the filtering net is movable between the first delivery circuit and the second delivery circuit to perform two-stage purifying circulation reciprocatingly to drain a purified gas from the air exhaust devices;
the filtering apparatus further comprising:
a deflection prevention device including multiple positioning seats and multiple positioning snaps;
wherein:
each of the positioning seats is provided with a C-shaped slot;
the positioning seats are mounted on two sides of each of the first delivery circuit and the second delivery circuit;
the positioning snaps are mounted on two sides of the filtering net and align with the positioning seats respectively; and
each of the positioning snaps is movable with the filtering net and is configured to be allowed to pass through the C-shaped slot of one of the positioning seats.

2. The filtering apparatus as claimed in claim 1, wherein the first delivery circuit and the second delivery circuit are perpendicular to each other.

3. The filtering apparatus as claimed in claim 1, wherein the conveyor includes multiple rolls configured for pressing the filtering net.

4. The filtering apparatus as claimed in claim 1, wherein the filtering net is made of a composite fabric with one layer or multiple layers.

5. The filtering apparatus as claimed in claim 3, wherein the filtering net is made of an active carbon or a HEPA high efficiency filter screen.

6. The filtering apparatus as claimed in claim 3, wherein the filtering net is a wet filtering net.

7. The filtering apparatus as claimed in claim 1, wherein the air exhaust devices have a number matching that of the air outlets of the exhaust pipe.

8. The filtering apparatus as claimed in claim 1, wherein the tank washing device further includes multiple dust collecting containers removably mounted on a bottom of the liquid tank.

* * * * *